United States Patent [19]

Kurosawa

[11] Patent Number: 4,527,120
[45] Date of Patent: Jul. 2, 1985

[54] SYSTEM FOR CONVERTING MECHANICAL MOVEMENT TO A DIGITAL SIGNAL

[75] Inventor: Ryoichi Kurosawa, Hachioji, Japan

[73] Assignee: Tokyo Shibaura Denki Kabushiki Kaisha, Kanagawa, Japan

[21] Appl. No.: 529,935

[22] Filed: Sep. 8, 1983

Related U.S. Application Data

[63] Continuation of Ser. No. 285,969, Jul. 23, 1981, abandoned.

[30] Foreign Application Priority Data

Aug. 6, 1980 [JP] Japan ................................ 55-108003

[51] Int. Cl.³ .......................... H03K 13/02; G05B 1/03
[52] U.S. Cl. .............................. 324/166; 340/347 CC;
340/347 SY; 318/661
[58] Field of Search ............... 318/801, 661, 807, 490,
318/654, 655; 340/347 SY, 347 CC; 331/24, 25;
324/166

[56] References Cited

U.S. PATENT DOCUMENTS

| | | | |
|---|---|---|---|
| 3,284,795 | 11/1966 | Fertig | 340/347 SY |
| 3,634,838 | 1/1972 | Granqvist | 340/347 SY X |
| 3,914,760 | 10/1975 | Logue | 340/347 CC |
| 4,023,085 | 5/1977 | Bishop | 318/661 X |
| 4,286,203 | 8/1981 | Ehret | 318/801 |
| 4,321,684 | 3/1982 | Sommeria | 318/661 X |

FOREIGN PATENT DOCUMENTS

| | | |
|---|---|---|
| 2381419 | 7/1983 | France . |
| 1304376 | 1/1973 | United Kingdom . |
| 1593140 | 7/1981 | United Kingdom . |

OTHER PUBLICATIONS

Grebene, "The Monolithic PLL, A Versatile Building Block", IEEE Spectrum-Mar. 1971, pp. 38-49.
Dewan, "Slip Speed Control in an Induction Motor Drive with a PLL"-Canadian Elec. Journal-1980.
Analog Devices-"Low Profile Synchro to Digital Converters-SDC 1700 Series", Data Acquisition Products Catalog Supplement, 1979, pp. 277S-282S.
Lavan, "Resolvers & Synchros"-Electromechanical Design, Jan. 1965-pp. 117-138.
Verfahren zur Wegmessung mit Inductosyn, by A. Signer et al., Wekstatt und Betrieb, 1975, Bd. 108, (pp. 507-513).

Primary Examiner—Stanley T. Krawczewicz
Assistant Examiner—Jose M. Solis
Attorney, Agent, or Firm—Stevens, Davis, Miller & Mosher

[57] ABSTRACT

A system for converting mechanical movement of a body under detection to a digital signal comprises a synchro generator having a primary and a secondary windings movable relative to each other, one of the windings capable of being coupled to said body, an exciting circuit for providing multiple-phase exciting currents to the primary winding at a frequency higher than the frequency corresponding to the maximum speed of the body, and a phase-locked-loop control circuit responsive to the output of the secondary winding for generating a frequency-multiplied digital signal at a frequency equal to the product of the frequency of an AC signal induced in the secondary winding and a predetermined factor.

4 Claims, 14 Drawing Figures

SYSTEM FOR CONVERTING MECHANICAL MOVEMENT TO A DIGITAL SIGNAL

This application is a continuation of application Ser. No. 285,969, filed July 23, 1981, now abandoned.

BACKGROUND OF THE INVENTION

The present invention relates to a system for converting rotational or linear mechanical movement of a body under detection to a digital signal indicative of the position, the speed, the acceleration or the like of the body.

In the past, a tachometer generator, having the same construction as a DC generator, was used for detecting the rotational speed of a rotating body. Detection of the speed of linear movement of a body was achieved by converting the linear movement into rotation and by detecting the rotational speed by means of a similar tachometer generator. Where an analog signal is used for a speed control, the output of a tachometer generator can be conveniently used as a feedback signal. Where the speed control system is composed of a digital circuitry incorporating a microcomputer or the like and hence requires a digital feedback signal, the output of the tachometer generator is converted by an analog-digital (A/D) converter into a digital signal. In such a system, the accuracy of control and the stability of the control system are dependent on the accuracy and the stability of the tachometer generator and hence advantages of the digital control are lost. Moreover, brushes in contact with a rotating member requires frequent inspection and maintenance thereof is troublesome.

In another conventional speed detection system a rotary pulse generator or a frequency generator generating an output of a frequency proportional to the rotational speed is used. The number of output pulses of the pulse generator or the frequency generator is counted and a digital signal indicative of the detected speed is produced. This system has a disadvantage in that the counting of the number of the output pulses of the pulse generator or the frequency generator has to be continued over a long time to attain a high resolution in speed detection. For instance, where a pulse generator which produces 1000 pulses per revolution is used for detecting, with a resolution of 10 bits or 0.1%, the rotational speed of 1500 r.p.m. (25 revolutions per second), the counting of the pulses takes 40 mS. As a result, response time cannot be made smaller than about 100 mS. In other words, it takes more than about 100 mS until the actual speed is made close to the reference value after the reference value is suddenly (following a step function curve) varied. Moreover, no pulse is produced by a rotary pulse generator until its rotor rotates a certain minimum angle, so that detection of a very low speed (very close to zero) is not possible. Accordingly, where the speed is to be controlled over a range extending both directions, this method of speed detection is particular unsatisfactory.

SUMMARY OF THE INVENTION

An object of the invention is to solve the abovementioned problems.

Another object of the invention is to provide a system for converting a mechanical movement to an electrical signal which is reliable and capable of quick detection of position, speed, acceleration or the like at a high resolution.

A further object of the invention is to provide a system for converting mechanical movement to a digital signal which can be used to form a control system having a quick response and a high performance.

According to the invention, there is provided a system for converting mechanical movement of a body under detection to a digital signal comprising:

a synchro generator having primary and secondary windings movable relative to each other, one of the windings capable of being coupled to the body, an exciting circuit for providing multiple-phase exciting currents to the primary winding at a frequency higher than the frequency corresponding to the maximum speed of the body, and a phase-locked-loop control circuit responsive to the output of the secondary winding for generating a frequency-multiplied digital signal at a frequency equal to the product of the frequency of an AC signal induced in the secondary winding and a predetermined factor.

DETAILED DESCRIPTION OF THE PREFERRED EMBODIMENTS

Figure 1:
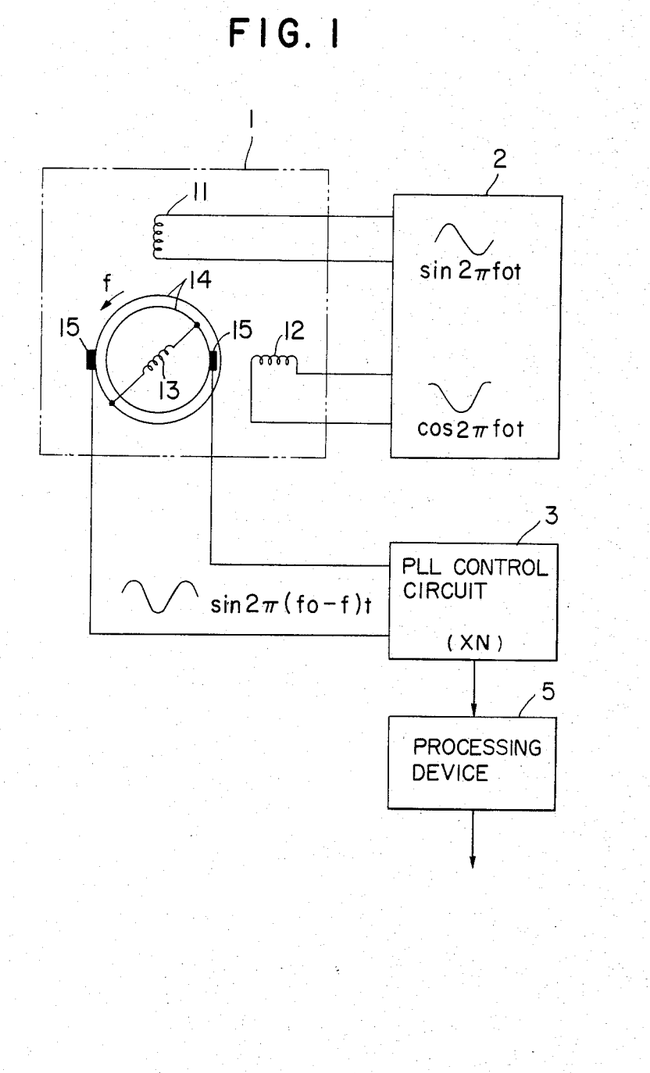
FIG. 1 is a block diagram showing an embodiment of the invention.

FIG. 1 shows an embodiment of the invention. An inductive rotary detector or a synchro generator 1 includes a stator and a rotor movable relative to each other. The rotor is capable of being coupled to a body under detection. Two-phase primary windings 11 and 12 are mounted on the stator. A single-phase secondary winding 13 is mounted on the rotor. Slip rings 14 and brushes 15 in contact with the slip rings 14 serve, in combination, to connect the secondary winding 13 and a phase-locked-loop (PLL) control circuit 3. It is incidentally noted that a synchro generator having two-phase windings is specifically called a "resolver".

In the embodiment shown, the synchro generator 1 has two poles.

The primary windings 11 and 12 are connected to the output of an exciting circuit 2, which produces two-phase sinusoidal waveform analog signals at a frequency $f_o$ higher than a frequency corresponding to the maximum speed of the body under detection.

The PLL control circuit 3 generates a frequency-multiplied digital signal at a frequency equal to the product of the frequency of an AC signal induced in the secondary winding 13 and a predetermined factor N of a natural number.

When the rotational speed of the rotor is zero, an AC signal of the same frequency $f_o$ is induced in the secondary winding 13 by the rotating magnetic field. The direction of rotation of the rotating magnetic field is assumed counter-clockwise as viewed in FIG. 1. If the rotor is rotated in the same counter-clockwise direction indicated by an arrow at a rotational speed f, an AC signal of a frequency $(f_o-f)$ equal to the relative rotational speed is induced in the secondary winding 13. If the rotor is rotated in a clockwise direction, the rotational speed f is given as a negative value. Where the rotational speed of the rotor varies over a range of $+f_{max} \geq f \geq -f_{max}$, the frequency of the AC signal induced in the secondary winding 13 varies over a range of $(f_o-f_{max})$ to $(f_o+f_{max})$.

Thus, an AC signal whose frequency varies with the rotational speed is obtained.

A processing device 5 is connected to the PLL control circuit 3 to receive a signal which appears in the PLL control circuit 3 and to process it to produce an information concerning the position, speed, or the like of the body under detection. Examples of the processing device 5 are shown in FIGS. 5, 6, 7 and 8.

Figure 2:
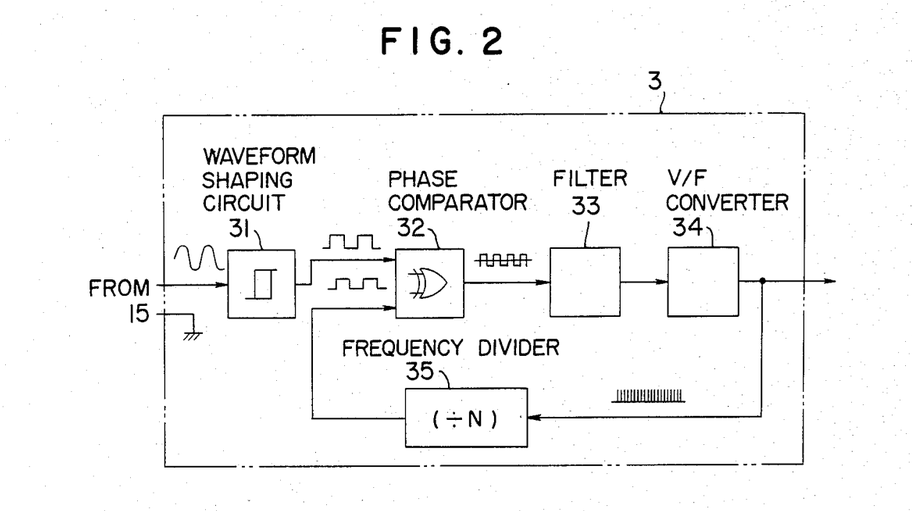
FIG. 2 is a block diagram showing an example of phase-locked-loop control circuit.

FIG. 2 shows, in detail, the internal construction of an example of the PLL control circuit 3. A waveform shaping circuit 31 converts an inputted AC signal to a digital square waveform signal. A phase comparator 32 is composed of an EXCLUSIVE-OR gate and receives the output signal of the waveform shaping circuit 31 and a square waveform signal from a frequency divider 35 and produces pulses (except when the two signals are precisely 90° apart from each other) at a frequency twice that of the inputted signals, in steady state, i.e., when the two inputted signals have the same frequency.

A loop filter 33 is a low-pass filter responsive to the output of the phase comparator 32 for producing a DC signal indicative of the average value corresponding to the phase difference deviation from 90°. A voltage-to-frequency converter (V/F converter) 34 receives the output of the loop filter 33 and produces a square waveform signal whose frequency is so controlled, in a manner described later, as to be equal to the product $(f_o-f) \cdot N$ of the frequency of the AC signal from the secondary winding 13 and the predetermined factor N. The output of the V/F converter 34 is fed back to the phase comparator 32 via the frequency divider 35 at which the signal frequency is divided by N.

The pulses outputted by the phase comparator 32 have ON time to OFF time ratio of 1:1 when the phase difference between the two inputs is 90°, and hence the average value is one half of the peak value $V_p$ of the pulses. When the phase difference deviates from 90°, the ON time to OFF time ratio becomes other than 1:1 and the average value becomes other than $\frac{1}{2}V_p$. As a result, variation occurs in the frequency of the pulses outputted from the V/F converter 34, and hence the frequency of the output of the frequency divider 35.

The above-described feedback loop operates to make the phase difference between the two square waveform signals inputted to the phase comparator 32 closer to 90°.

The response characteristic of the overall PLL control circuit 3 is dependent on the frequency characteristic of the loop filter 33. The necessity to remove a frequency component (introduced due to the operation of the phase comparator 32) of a frequency twice the input frequency imposes a restriction on the frequency characteristic. AC components contained in the output of the phase comparator 32 lower than the cut-off frequency of the loop filter 33 are not removed, so that the frequency of the output of the V/F converter 34 fluctuates and proper function of the feedback loop is not attained, and as a result, a proper frequency-multiplying operation is not ensured. The AC signal inputted to the PLL control circuit 3 should therefore have as high a frequency as possible, and as small a frequency variation range as possible, and should not be of a frequency of zero. It will be seen that the AC signal induced in the secondary winding 13 satisfies the above-mentioned requirements.

Assume, for example, that the exciting frequency $f_o$ is 1 KHz, the maximum speed is ±1500 r.p.m., i.e., $f_{max}$ is ±25 rps, the multiplying factor N is 4,000, the frequency of the input to the PLL control circuit is within the range of from 975 Hz to 1025 Hz and the multiplied frequency is 3.9 MHz to 4.1 MHz. The cut-off frequency of the loop filter 33 can be set at several hundred Hz, and the response time (within which response to the variation in the input frequency is effected) can be made within several mS.

Figure 5:
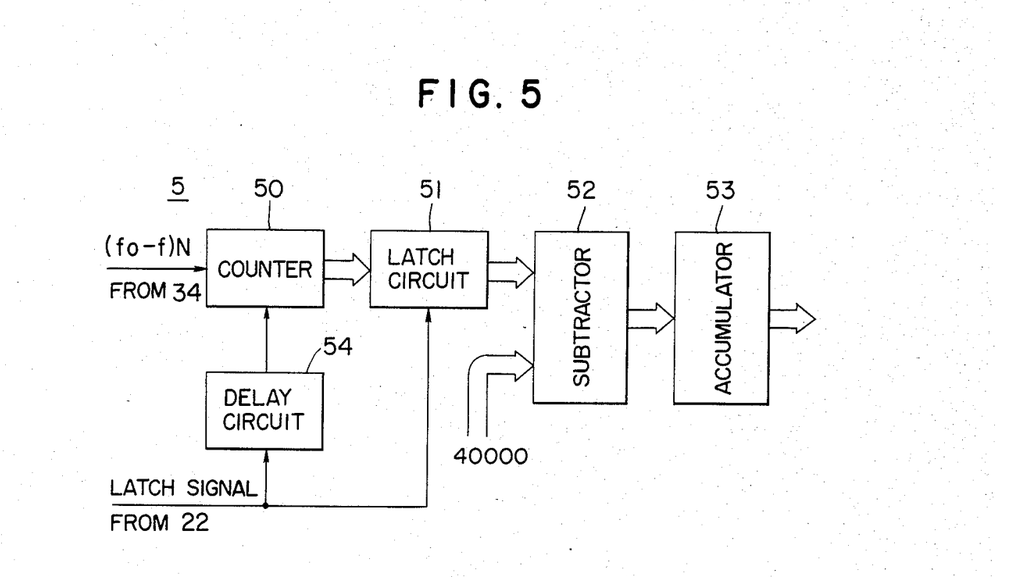
FIGS. 5 through 8 are block diagrams showing examples of processing devices.

FIG. 5 shows an example of processing device 5. This processing device 5 comprises a counter 50. The input of the counter 50 is connected to the output of the V/F converter 34. The counter 50 starts counting every 10 mS, a multiple of the period (1 mS) of the exciting frequency, and is reset before it starts next counting. At the end of the 10 mS period, the count value of the counter 50 will be 39,000 when f=25 rps; 40,000 when f=0; and 41,000 when f=−25 rps. It will be seen that the count value at the end of the counting period varies within the range of 39,000 to 41,000 depending on the rotational speed. The count value at the end of the counting period is latched by a latch circuit 51 and thereafter transferred to a subtractor 52 where a predetermined subtrahend of 40,000 is subtracted from the inputted count value to result in a difference of −1,000 to +1,000. The difference signal is proportional in magnitude to the rotational speed and has a sign corresponding to the direction of the rotation.

An accumulator 53 accumulates the value of the signal from the subtractor 52 to produce a signal indicative of the rotary position of the rotor.

The latching operation of the latch circuit 51 is effected upon receipt of a latch signal produced by the frequency divider 22 at the exciting frequency. The same latch signal is supplied through a delay circuit 54 to the counter 50 to clear the counter 50.

The subtractor 52 and the accumulator 53 shown in FIG. 5 can be formed of a microcomputer programmed to perform the above-described function of the subtractor 52 and the accumulator 53.

In this way, a digital signal indicative of the speed can be obtained every 10 mS, with a resolution of 10 bits or 0.1%. The accuracy of the speed detection is dependent on the accuracy in determining the exciting frequency and the accuracy in determining the length of time over which one counting operation by the counter 51 is continued. If these are determined by the use of a crystal oscillator, the accuracy of the speed detection can be made in the order of $10^{-5}$ or $10^{-6}$. Pulse counters incorporating a crystal oscillator have been widely used.

Figure 3:
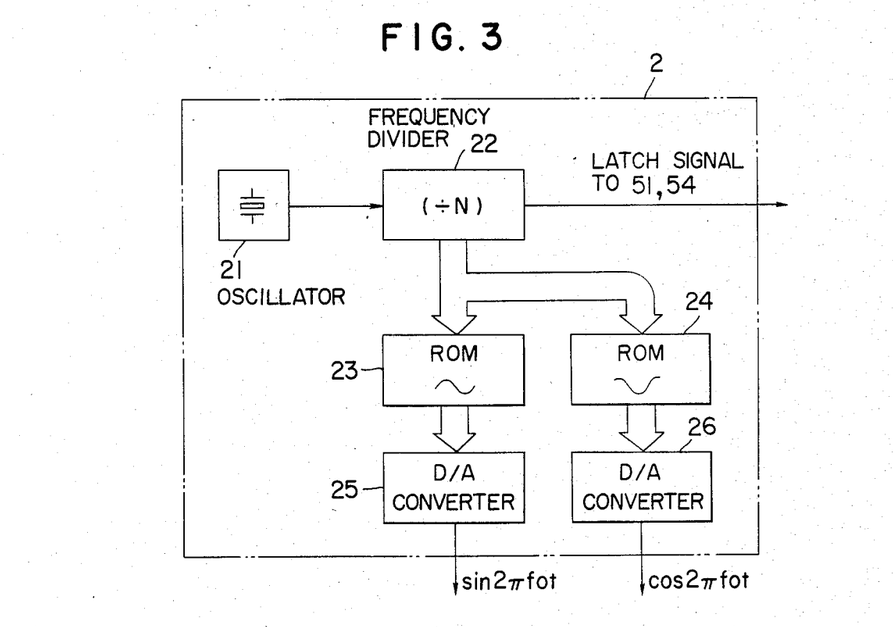
FIG. 3 is a block diagram showing an example of exciting circuit.

An example of exciting circuit 2 is shown in FIG. 3. A crystal oscillator 21 produces a signal of a frequency of 1 MHz, which is frequency-divided by a factor of 1,000 at a frequency divider 22 to produce 1 KHz signal. The frequency-divided 1 KHz signal is inputted to a read only memory devices (ROM's) 23 and 24. The ROM's 23 and 24 respectively store sine and cosine functions, and produce, in response to the 1 KHz input signal, instantaneous values of the sine and cosine functions. The digital output signals of the ROM's 23 and 24 are fed to digital-to-analog (D/A) converters 25 and 26 which respectively produce, in response to the series of the digital signals from the ROM's 25 and 26, analog signals of sine and cosine waveforms, i.e., two-phase sinusoidal waveform signals, at a frequency of 1 KHz, with the accuracy of the crystal oscillator.

Figure 6:
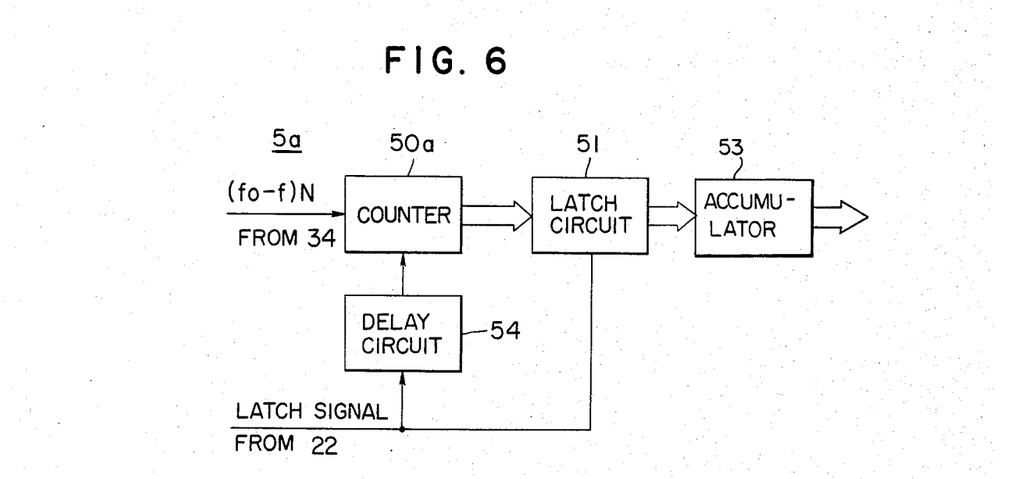

FIG. 6 shows another example of processing device 5a. This processing device 5a comprises a counter 50a. The counter 50a has a full scale of 4,000. The input of the counter 50a is connected to the output of the V/F converter 34. The counter 50a starts counting every 10 mS, a multiple of the period (1 mS) of the exciting frequency. The count value is latched by a latch circuit 51 similar to that shown in FIG. 5 when a latch signal is supplied to the latch circuit 51. The counter 50a is reset by a latch signal fed through a delay circuit 54, before it starts next counting. Within 10 mS, 39,000 to 41,000 pulses are fed to the counter 54, but because of overflow, the count value at the end of 10 mS period will be 3,000 when f = +25 rps; 0 when f = 0 rps; and 1,000 when f = −25 rps. The count values within the range of 3,000 to 3,999 can be treated as values corresponding to the speed within the range of +25 rps to 0 rps. The count values within the range of 0 to 1,000 can be treated as values corresponding to the speed within the range of 0 rpm to −25 rps. Thus, a signal indicative of the rotational speed is obtained. An accumulator 53 similar to that shown in FIG. 5 is used to accumulate the count value of the counter 54 to produce a signal indicative of the rotary position.

Figure 4:
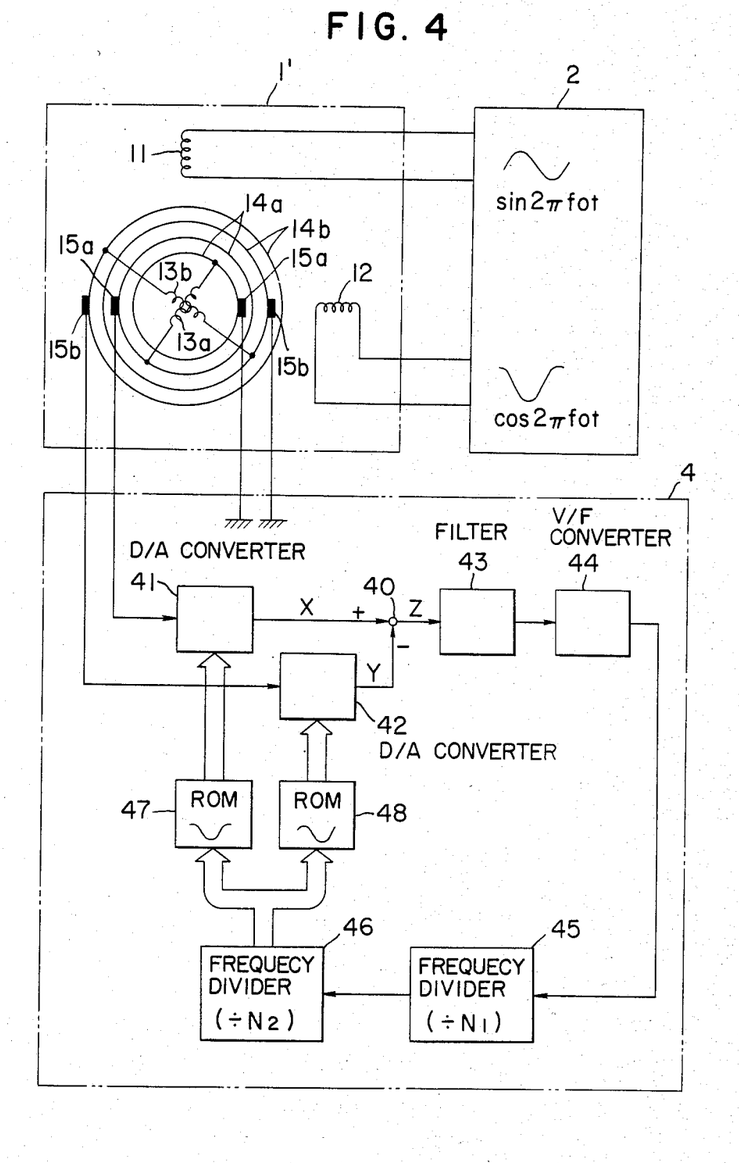
FIG. 4 is a block diagram showing another embodiment of the invention.

FIG. 4 shows another embodiment of the invention. In this embodiment, a synchro generator 1' with two pairs of poles is used in place of the synchro generator 1 shown in FIG. 1. The rotor of the synchro generator 1' has two-phase secondary windings 13a and 13b. The exciting circuit 2 is similar to the exciting circuit 2 shown in FIG. 1 and provides the primary windings 11 and 12 with two-phase currents at a frequency $f_o = 100$ Hz.

Two-phase AC signals $\sin\{2\pi(f_o-2f)t\}$ and $\cos\{2\pi(f_o-2f)t\}$ are induced in the secondary windings 13a and 13b and are transferred through slip rings 14a and 14b and brushes 15a and 15b to a PLL control circuit 4. The PLL control circuit 4 of this embodiment comprises digital-to-analog (D/A) converters 41 and 42, each of which has a function of multiplying the analog input signal by a digital input signal. An example of commercially available D/A converter having such a function is an integrated circuit AD7523 supplied by Analog Devices, Inc., U.S.A. Supplied as the digital input signals to the D/A converters 41 and 42 are those representing two-phase sinusoidal waves $\cos\{2\pi(f_o-2f)t-\Delta\theta\}$ and $\sin\{2\pi(f_o-2f)t-\Delta\theta\}$ from the ROM's 47 and 48. The outputs X and Y of the D/A converters 41 and 42 are respectively expressed by the following expressions:

$$X = \sin\{2\pi(f_o-2f)t\}\cdot\cos\{2\pi(f_o-2f)t-\Delta\theta\}$$

$$Y = \cos\{2\pi(f_o-2f)t\}\cdot\sin\{2\pi(f_o-2f)t-\Delta\theta\}$$

A subtractor 40 subtracts Y from X to obtain Z which is equal to $\sin\Delta\theta$. Thus the phase difference $\Delta\theta$ between the two pairs of two-phase sinusoidal waves is, in effect, detected.

It should however be noted that the digital sinusoidal waveform signals from the ROM's 47 and 48 are of approximately sinusoidal waveform with $N_2$ stepping variations in level during one cycle, $N_2$ being the division factor of a frequency divider 46. As a result, the phase difference $\Delta\theta$ contains a ripple of a frequency equal to $(f_o-2f)\times N_2$. To remove the ripples, the output signal Z from the subtractor 40 is fed to a loop filter 43 whose cut-off frequency is chosen to remove such ripples. The output of the loop filter 43 is inputted to a voltage-to-frequency (V/F) converter 44. The output of the V/F converter 44 is fed back through frequency-dividers 45 and 46 to read-only-memory devices (ROM's) 47, 48. This feedback loop functions to make the phase difference $\leftarrow\theta$ closer to zero. As a result, the two-phase sinusoidal waves from the rotor and the two-phase sinusoidal waves from the ROM's 47, 48 coincide with each other, and pulses of a frequency equal to $(f-2f_o)\times N_1\times N_2$ are obtained at the output of the V/F converter 44.

The cut-off frequency of the loop filter 43 is chosen to remove the frequency equal to $N_2$ times the lowest frequency of the output of the secondary windings, i.e., $N_2\times(f_o-2f_{max})$. For instance, if the exciting frequency $f_o$ is 100 Hz, the division ratio $N_2$ is 100, and division ratio $N_1$ is 400, then the cut-off frequency of the loop filter 43 can be selected at several KHz and the response time can be made within 1 mS. If the maximum rotational speed $f_{max}$ of the rotor is set at 12.5 rps, the AC signals inputted to the D/A converters 41 and 42 will have a frequency within a range of from 75 Hz to 125 Hz. The output of the V/F converter 44 is pulses of a frequency of 3 MHz to 5 MHz. If the pulses are fed to a counter similar to that shown in FIG. 5, for a period of 1 mS, 3,000 to 5,000 pulses are counted. If pulse number 4,000 corresponding to the zero speed is subtracted, the result of −1,000 to +1,000 is obtained. Thus, counting over 1 mS enables speed detection at a resolution of 10 bits.

If the speed thus detected is integrated, by having the pulses accumulated, by the use of an accumulator similar to that shown in FIG. 5 a distance of travel by a body under inspection can be measured.

Figure 7:
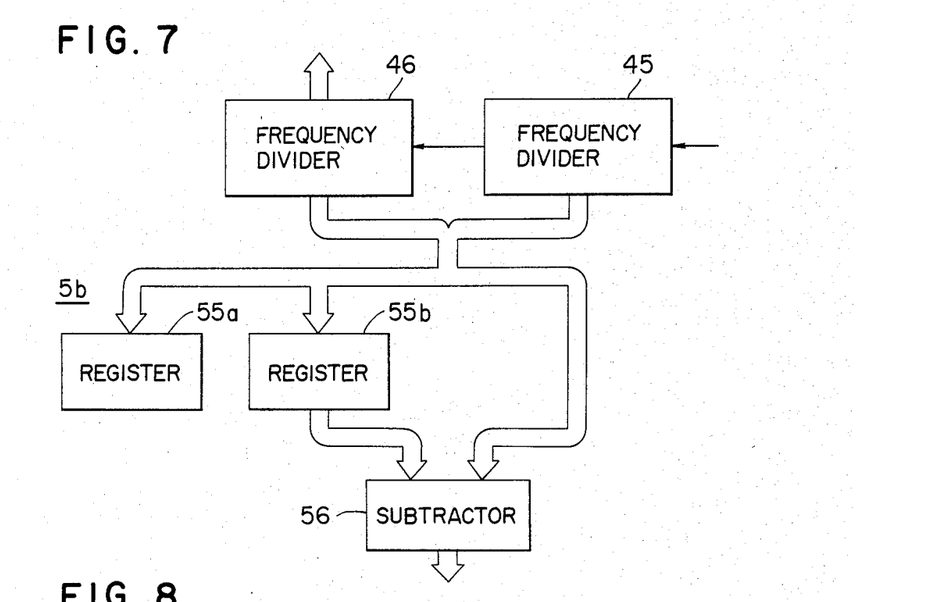

FIG. 7 shows another example of processing device 5b, which can be used when each of the frequency dividers 45 and 46 is formed of a counter which overflows upon counting up to the division factor $N_1$ (=400) or $N_2$ (=100). The count values of the counters 45 and 46 indicate, in combination, the number of pulses produced at the output of the V/F converter 44. The number of pulses $N_p$ produced during a period of the exciting frequency at the output of the V/F converter 44 is $N_p = N\times(f_o-2f)/f_o$.

In the above equation, $N\times(-2f)/f_o$ represents effects of rotation of the rotor, while $N\times(f_o/f_o)$ represents effects of the exciting current.

Accordingly, if $N\times(f_o/f_o)=N$ is subtracted from $N_p$, the number of pulses representative of the rotation of the rotor is obtained. The subtraction of N is achieved by the overflowing action of the counters 45 and 46 once a period of the exciting frequency. Thus, if the count values of the counters 45 and 46 are sampled once a period of the exciting frequency, a signal indicative of the rotary position is obtained. A register 55a is used to store the sampled count values and produces the sampled count values as an instantaneous value of the rotary position.

The count values of the counters 45 and 46 are also sampled and transferred to by a register 55b and a subtractor 56 once a multiple of the period of the exciting currents, e.g. every 10 mS. The register 55b stores the value which has been sampled and outputs it upon next sampling. The subtractor 56 subtracts the value outputted by the register 55b from the value concurrently outputted by the counters 45 and 46. Thus, the subtractor 56 obtains the difference between the count values at successive samplings.

Because the counters 45 and 46 overflow upon counting up to $N_1=400$ and $N_2=100$, respectively, a combined count value at a time point and a combined count value upon counting $N=N_1 \times N_2=40,000$ thereafter are the same with each other. The subtraction by the subtractor 56 will produce a value given by an equation $N_d=N \times (f_o-2f)/f_o-N=N \times (-2f/f_o)=40,000 \times (-2f/100)$. When $f=12.5$ rps, $N_d=-1,000$. When $f=0$, $N_d=0$. When $f=-12.5$ rps, $N_d=+1,000$. Thus, the value $N_d$ will be within the range of $-1,000$ to $+1,000$, and is different for different speed f. In this manner, a digital signal indicative of the rotational speed f is obtained.

Figure 8:
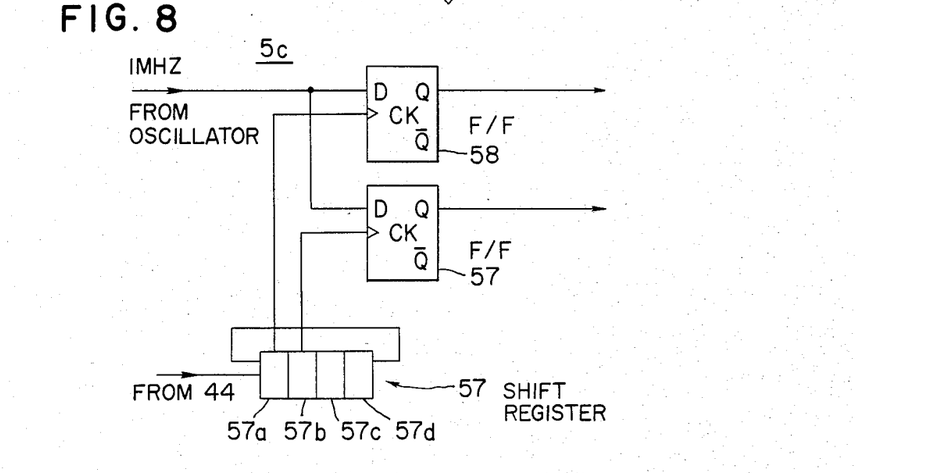
Figure 9A:
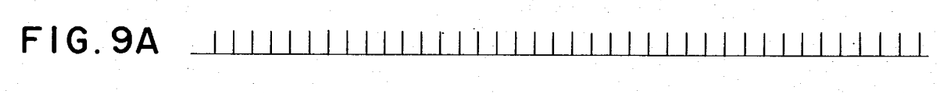
FIGS. 9A through 9F are time charts showing operation of the processing device shown in FIG. 8.
Figure 9B:
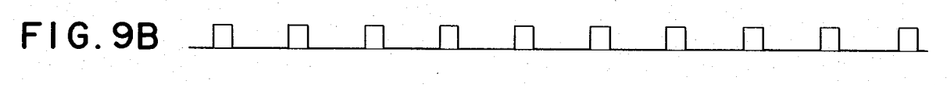
Figure 9C:
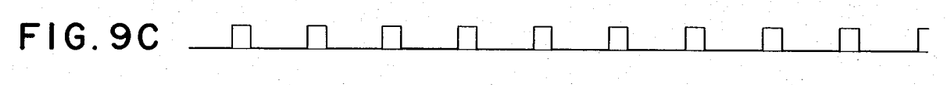
Figure 9D:
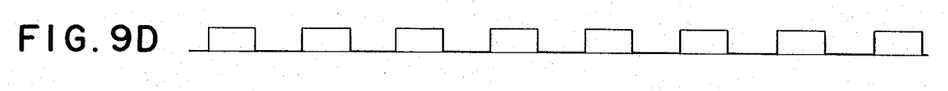
Figure 9E:
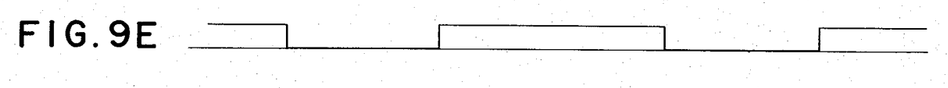
Figure 9F:
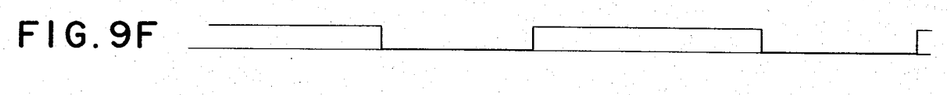

FIG. 8 shows a further example of processing device 5c, which produces pulses during rotation of the rotor, and can be used in substitution for a rotary pulse generator. The processing device 5d comprises a four-bit shift register 57 which receives the output (FIG. 9A) of the V/F converter 44 shown in FIG. 4, as a clock signal. At any moment, only one of the four stages 57a–57d has a content of "H" level. Every time the shift register 57 receives a pulse from the V/F converter, the "H" level content in the stage 57a, 57b or 57c is transferred to the right stage. The "H" level content in the rightmost stage 57d is transferred to the leftmost stage 57a. Thus, the output of the V/F converter is frequency-divided by four. The contents of the first and second stages 57a and 57b (FIGS. 9B and 9C) are taken out and applied to D type flip-flop circuits 58 and 59 as their clock signals. The flip-flop circuits 58 and 59 receive at their inputs a 1 MHz output (FIG. 9D) of an oscillator similar to the oscillator 22 shown in FIG. 3. Each of the flip-flop circuits 58 and 59 samples the output of the oscillator, every time a pulse is supplied from the stage 57a or 57b, i.e., at a frequency of $f_s$ of the pulses from the stages 57a or 57b and produces pulses (FIGS. 9E, 9F) at a beat frequency equal to the difference between the frequency of the output of the oscillator and the frequency $f_s$. The frequency $f_s$ is one fourth of the frequency of the output of the V/F converter 44, i.e., $\frac{1}{4} \times (f_o-2f) \times N = \frac{1}{4} \times (100-2f) \times 40,000 = 10,000 \times (100-2f)$. Since f is within the range of $-12.5$ to $+12.5$ rps, the frequency $f_s$ is within the range of 0.75 MHz to 1.25 MHz. Accordingly, the beat frequency is within the range of 0 to 250 KHz. Direction of rotation is detected from the relative phase of the pulses (FIGS. 9E and 9F) outputted from the flip-flop circuits 56 and 57. The time chart of FIGS. 9A–9F is drafted on an assumption that $f=+12.5$ rps, so that $f_s=1.25$ MHz and the frequency of the output pulses is 250 KHz.

The fact that the pulses of 250 KHz are produced when the rotational speed is 12.5 rps means that 20,000 pulses are produced during one revolution. Thus, the number of pulses obtained during one revolution is greater than in the conventional rotary pulse generators. The pulses thus produced can be counted by a counter for detecting the rotary position of the body under detection.

In the embodiments illustrated, a rotor having slip rings is used. But, a rotor with a rotary transformer may be used in place, to eliminate the brushes. This will improve the reliability of the system.

In the embodiments, a stator having two-phase exciting windings is used. But, a stator having three-phase windings may alternatively be used to produce a rotating magnetic field. A stator having multiple windings with a phase number greater than three may also be used.

The exciting windings may be provided on the rotor instead of the stator.

Where an inductive type detector of a linear type is used in place of the rotary speed detector shown in FIGS. 1 and 4, the output from the detector can be processed in the same manner as described with reference to the embodiments.

The signals indicative of the position and the speed obtained by the use of the systems described can be used as feedback signals in a control system.

What is claimed is:

1. A system for converting mechanical movement of a body under detection to a digital signal comprising:
    a synchro generator having a plurality of primary windings and at least one secondary winding, said primary windings and said secondary winding being movable relative to each other, one of said secondary winding and said plurality of primary windings being capable of being coupled to said body,
    an exciting circuit for providing multiple-phase exciting currents to said primary windings at a frequency higher than the frequency corresponding to the maximum speed of said body, and
    a phase-locked-loop control circuit responsive to the output of said secondary winding for generating a frequency-multiplied digital signal at a frequency equal to the product of the frequency of an AC signal induced in said secondary winding and a predetermined factor,
    said phase-locked-loop control circuit comprising a voltage-to-frequency converter, a frequency-divider circuit adapted to receive the output of said voltage-to-frequency converter, phase comparing means, adapted to receive said AC signal from said secondary winding and the output of said frequency-divider circuit for producing a phase-difference signal indicative of the phase difference between said AC signal from said secondary winding and said output of said frequency-divider circuit, wherein said phase-locked-loop control circuit further comprises a loop filter which receives the output of said phase comparing means and produces a DC signal indicative of the average value of the phase difference, said voltage-to-frequency converter being responsive to the output of said loop filter, and controlled to produce said frequency-multiplied signal,
    said system further comprising counter means, for counting the number of cycles of said frequency-multiplied signal, said counter means having a full scale equal to said predetermined factor,
    sampling means for sampling the count value of said counter means at an interval equal to a multiple of the period of said exciting current,
    said counter means being adapted to reset immediately after the count value is sampled, and
    said sampling means providing a signal indicative of the sampled count value which represents the speed of said body.

2. A system according to claim 1, further comprising accumulator means for accumulating the count value sampled immediately before said counter means is reset, and providing a signal indicative of the accumulated value which represents the position of said body.

3. A system for converting mechanical movement of a body under detection to a digital signal comprising:
- a synchro generator having a plurality of primary windings and at least one secondary winding, said primary windings and said secondary winding being movable relative to each other, one of said secondary winding and said plurality of primary windings, being capable of being coupled to said body,
- an exciting circuit for providing multiple-phase exciting currents to said primary windings at a frequency higher than the frequency corresponding to the maximum speed of said body, and
- a phase-locked-loop control circuit responsive to the output of said secondary winding for generating a frequency-multiplied digital signal at a frequency equal to the product of the frequency of an AC signal induced in said secondary winding and a predetermined factor,
- said phase-locked-loop control circuit comprising a voltage-to-frequency converter, a frequency-divider circuit adapted to receive the output of said voltage-to-frequency converter, phase comparing means adapted to receive said AC signal from said secondary winding and the output of said frequency-divider circuit for producing a phase-difference signal indicative of the phase difference between said AC signal from said secondary winding and said output of said frequency-divider circuit, wherein said phase-locked-loop control circuit further comprises a loop filter which receives the output of said phase comparing means and produces a DC signal indicative of the average value of the phase difference, said voltage-to-frequency converter being responsive to the output of said loop filter, and controlled to produce said frequency-multiplied signal,
- said frequency divider circuit counting the number of cycles of said frequency-multiplied signal and having a full scale equal to said predetermined factor,
- said system further comprising sampling means for sampling the count value of said frequency divider circuit at an interval equal to a multiple of the period of said exciting current, and providing a signal indicative of the sampled count value which represents the position of said body.

4. A system according to claim 3, further comprising difference detection means for determining a difference between the count values at successive sampling operations, and providing a signal indicative of the difference which represents the speed of said body.

* * * * *